UNITED STATES PATENT OFFICE.

LUDWIG GATTERMANN, OF FREIBURG, BREISGAU, GERMANY, ASSIGNOR TO FARBENFABRIKEN VORM. FRIEDR. BAYER & CO., OF ELBERFELD, GERMANY, A CORPORATION OF GERMANY.

SELENOCYANIDS OF THE ANTHRAQUINONE SERIES.

1,065,441.     Specification of Letters Patent.      Patented June 24, 1913.

No Drawing.      Application filed January 17, 1913. Serial No. 742,693.

*To all whom it may concern:*

Be it known that I, LUDWIG GATTERMANN, doctor of philosophy, professor of chemistry, citizen of the German Empire, residing at Freiburg, in Breisgau, Germany, have invented new and useful Improvements in Selenocyanids of the Anthraquinone Series, of which the following is a specification.

I have found that the hitherto unknown selenocyanids of the anthraquinone series can be obtained by boiling diazoselenocyanids. The reaction proceeds according to the following equation:

$$C_{14}H_7O_2.N_2.SeCN = N_2 + C_{14}H_7O_2.SeCN.$$

The selenocyanids having most probably the formula A—Se—CN (A being the anthraquinone radical) can be split up into selenophenols by means of alcoholic caustic soda lye. The new products are to be used for the production of dyestuffs and of pharmaceutical products.

In order to illustrate the new process more fully the following examples are given, the parts being by weight:

Example 1: 2.2 parts of 1-aminoanthraquinone are diazotized in concentrated sulfuric acid with nitrosylsulfuric acid. On diluting with ice the diazosulfate is precipitated. It is filtered off, dissolved in water and mixed with an aqueous solution of 1.5 parts of potassium selenocyanid. A red selenocyanid is precipitated, which already in the cold loses part of nitrogen. In order to complete the reaction the mass is heated until the development of nitrogen ceases, a crystalline bright orange colored precipitate of 1 selenocyananthraquinone being formed. It crystallizes from nitrobenzene in yellow-red needles (melting point 249° C.).

By treating the 1-selenocyanid of anthraquinone with alcoholic potash a dark green solution of the selenophenolate is obtained from which the selenophenol having most probably the formula $$C_{14}H_7O_2.SeH$$

is precipitated by acidulating the solution. It crystallizes from glacial acetic acid in the shape of orange-red leaflets melting at 212° C. It dyes wool in orange-red shades.

Example 2: 3.4 parts of 1-amono-5-anthraquinone sulfonic acid (sodium salt) are diazotized in concentrated sulfuric acid with nitrosyl sulfuric acid. By diluting with ice the diazosulfate is precipitated. It is filtered off, mixed with an aqueous solution of 1.4 parts of the potassium selenocyanid and heated at first to from 60–70° C. and at last to boiling, a red-brown solution being obtained a development of nitrogen taking place. On cooling yellow needles of the potassium salt of the 1-selenocyano-5-anthraquinone-sulfonic acid are separated. By treating this compound with caustic soda lye the 1-selenophenol-5-sulfonic acid (sodium salt) is obtained which dyes wool yellowish-red.

In an analogous manner other selenocyanids are obtained on using beta-aminoanthraquinones, diaminoanthraquinones and the derivatives of all these compounds.

I claim:—

1. The new selenocyanids of the anthraquinone series having most probably the formula A—Se—CN (A being the anthraquinone radical) being obtained from diazoselenocyanids, which are converted into selenophenols by treatment with alkali, substantially as described.

2. The new 1-selenocyananthraquinone having most probably the formula:

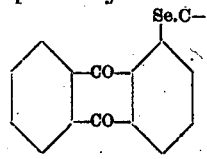

which crystallizes from nitrobenzene in yellowish-red needles melting at 249° C., being converted into the 1-anthraquinoné-selenophenol by treatment with alkali which selenophenol dyes wool yellowish-red shades, substantially as described.

In testimony whereof I have hereunto set my hand in the presence of two subscribing witnesses.

LUDWIG GATTERMANN.

Witnesses:
    FRANCES R. JEWETT,
    JACOB SCHMIDT.